April 6, 1937.  C. E. REED  2,076,002
ANTIFRICTION BEARING ASSEMBLY FOR EARTH BORING DRILLS
Filed Nov. 6, 1935
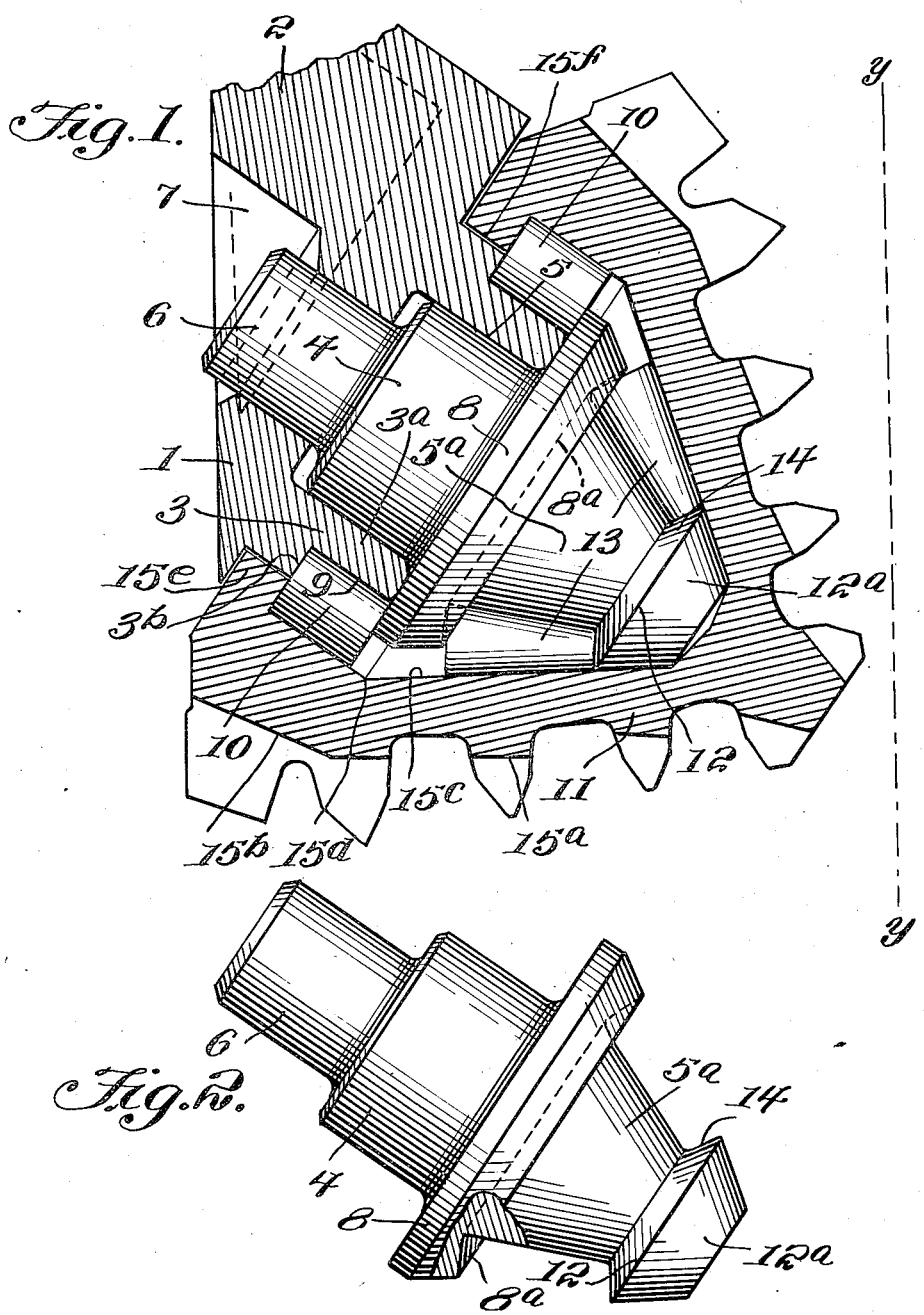
INVENTOR:
Clarence E. Reed,
By Spear, Donaldson & Hell ATTORNEYS Patented Apr. 6, 1937

2,076,002

UNITED STATES PATENT OFFICE 2,076,002

ANTIFRICTION BEARING ASSEMBLY FOR EARTH BORING DRILLS

Clarence E. Reed, Wichita, Kans., assignor to Chicago Pneumatic Tool Company, New York, N. Y., a corporation of New Jersey Application November 6, 1935, Serial No. 48,576

4 Claims. (Cl. 255—71)

The invention lies in the features and combination and arrangement of parts hereinafter described and particularly pointed out in the claims.

The drawing shows in:

Fig. 1 a toothed roller cutter in section mounted upon a spindle with anti-friction bearings and locking means between them, the latter parts being shown in elevation.

Fig. 2 is a view of a removable section of the spindle.

In the drawing there is indicated a spindle support formed in one piece with a body portion 1, a shank portion 2, which latter is adapted to be secured in the bit head, and a spindle portion 3 which has an annular flange 3a and a shoulder 3b. Within this annular portion of the main spindle section 3 is fitted the stem 4 of a removable section 5 of the spindle, said stem having a reduced end 6 extending through the body of the support into a recess 7 thereof, where it is secured by welding. This terminal or free end section of the spindle has a flange 8 formed in one piece therewith, which fits against the end face of the annular flange 3a of the main section of the spindle and extends outwardly beyond the periphery of said flange and forms between itself and the shoulder 3b a groove or raceway 9 adapted to receive cylindrical roller bearings 10 which take radial loads, and as hereinafter pointed out, these roller bearings play a part in locking the roller cutter 11 rotatively on the spindle. The extreme free end of the terminal section of the spindle has a head or flange 12 of reduced diameter as compared with the maximum diameter of the spindle, and between this head or flange and the flange 8 of said terminal section there is a frusto-conical zone 5a which tapers towards the free end of the spindle.

The base portion of this tapered zone is of less diameter than the adjoining flange 8 and the small end of this tapered zone is of less diameter than the head or flange 12 at the inner free end of the spindle.

In the groove or raceway thus provided between the flanges 8 and 12, conical roller bearings 13 are located to roll on the conical surface of the spindle. The small ends of these tapered rollers, i. e., the ends thereof nearest the free end of the spindle, bear upon the shoulder 14 of flange 12, which face or shoulder is inclined to the axis of the spindle to conform to and furnish a bearing for the small end faces of the frusto-conical rollers, and it will be noted that this shoulder 14 is of sufficient width to afford a bearing surface for the entire end face of the conical rollers at their smaller ends, which point in a direction towards the vertical axis of the drill indicated by the dotted line y—y, it being understood that the organization is of that general type in which a spindle projects downwardly and inwardly from its support towards the vertical axis of the drill, said support including the shank above mentioned, which extends up into a seat in the bit head to which it is fastened. The larger outer ends of the tapered roller bearings engage the flange 8, said flange being undercut at 8a, to receive a part of the large end of each tapered roller, the flange reaching to about the axial center of the end face of said roller.

The head or flange 12 at the extreme inner or free end of the spindle has a terminal face or friction bearing 12a of frusto-conical form. The incline of this face is substantially coincident with the incline of the face of the tapered rollers.

The roller cutter 11 is formed in one piece with a toothed frusto-conical zone 15a and a toothed base zone 15b which may be, as shown, frusto-conical, but higher in projected altitude than the altitude of the apex zone 15a.

This cutter encloses the free end of the spindle and it has a frusto-conical bore, the wall 15c of which bears frictionally on the tapered face 12a, at the extreme end of the spindle, and on the conical roller bearings 13. This tapered bore continues substantially to the point 15d, from which point the wall of the bore is cylindrical, to the flange 15e projecting inwardly at the base of the cutter, and contacts with the periphery of the cylindrical roller bearings 10.

The flange 15e at the base of the roller cutter engages the end face of the cylindrical roller bearings 10 and the face of this flange at the base thereof bears frictionally at 15f upon the peripheral surface of the main part of the spindle at the base thereof.

The organization can be assembled by placing the conical rollers in the raceway or groove formed by the tapered portion of the terminal section of the spindle, then placing this end section of the spindle with the tapered rollers thereon within the apex portion of the bore of the cutter with the extreme tapered face of the spindle in frictional contact with the tapered wall of the cutter bore at the apex portion thereof. Next, the cylindrical roller bearings are introduced through the annular space between the flange at the base of the cutter and the cylindrical peripheral surface of the stem 4 of the terminal section of the spindle. Said rollers, after being passed through this annular space are moved outwardly in a direction radial to the axis of the organization so as to lie against the cylindrical wall of the bore at the base zone of the cutter. Then the main section of the spindle is inserted with its flange occupying the space between the cylindrical roller bearings and the cylindrical stem 4 of the terminal section of the spindle with the shoulder 3b engaging the end face of the roller bearing and with the cylindrical surface of the main part of the spindle in frictional contact with the wall of the bore of the base flange of the cutter i. e. at 15f. Then the reduced end of the stem of the spindle's terminal section is welded to the cutter support and the assembly is complete.

It will be noticed that the conical roller cutter has an annular friction bearing surface within its base bore and an annular tapered friction surface at the inner end portion of the apex portion of its bore.

The flange or head at the extreme inner end of the spindle covers the face at the smaller end of the conical roller, of the full diameter thereof and said head furnishes an annular tapered friction bearing face at its extreme end with which the wall of the tapered bore at the apex portion of the cutter contacts. The organization therefore presents limited friction bearing surfaces between the cutter and spindle at each end of the spindle, with cylindrical roller bearings sustaining radial loads and tapered roller bearings sustaining end thrust of the cutter outwardly towards the spindle support, or in other words, thrusts that take place in a direction radially outward from the vertical axis y—y of the drill organization.

These tapered rollers also sustain thrusts which are substantially upward relative to the bottom of the hole being drilled.

The cylindrical roller bearings lock the roller cutter rotatively on the spindle by reason of the base flange of the cutter contacting the outer side faces of these rollers.

The frictional bearing at the bore of the base flange of the cutter contributes a steadying effect to the action of the cutter which is aided also by the friction bearing between the apex portion of the cutter bore and the extreme end of the spindle, which effect is of advantage at all times and particularly after some wear has taken place.

Because the tapered wall of the cutter bore extends clear to its point of junction with the cylindrical raceway portion in the base of the cutter, the cylindrical roller bearings are relieved of all end thrust outwardly toward the spindle support. Also because the head or flange at the free end of the spindle covers the full diameter of end faces of conical rollers there will be no end thrust of the cutter imposed on said rollers at this point, these rollers, however, as above mentioned taking thrust of the cutter outwardly by reason of the wall of the tapered bore of the cutter contacting the peripheral surface of the rollers.

This present application concerns certain modifications of the structure disclosed in applicant's copending application Serial No. 28,329, filed June 25, 1935.

I claim:

1. In a roller cutter and spindle assembly for earth boring drills the combination of a frustoconical roller cutter, a spindle having a free end inclosed by said cutter, said cutter and spindle having between them at their bases an annular friction bearing and having an annular tapered friction bearing between the free end of the spindle and the wall of the cutter bore at the apex portion of said bore, and rolling bearings between the cutter and the spindle, including cylindrical rollers and tapered rollers located at a zone of said spindle intermediate the annular tapered friction bearing and the said friction bearing at the bases of the cutter and spindle, the wall of the cutter bore being tapered to bear on said tapered rollers and coincident with the tapered friction bearing portion of said wall.

2. A roller cutter and spindle organization for earth boring drills comprising a roller cutter having a tapered bore, a spindle having a flange at its inner end, and a tapered surface complementary to the tapered wall of the cutter bore, tapered rollers between said tapered surface of the spindle and the complementary wall of the cutter, said flange covering the full diameter of the end faces at the small ends of the tapered rollers, said flange having also an annular friction bearing for the cutter, said tapered rollers taking radial thrust and end thrust of the cutter only through contact of the cutter with the peripheries of the frustoconical rollers, and cylindrical rollers between the base portions of said roller cutter and spindle, substantially as described.

3. In a roller cutter and spindle assembly for earth boring drills, the combination of a spindle, a toothed rotary cutter of frustoconical form, complementary friction bearing surfaces of limited area at each end of the spindle and the wall of the cutter bore, cylindrical roller bearings between the spindle and the roller cutter sustaining radial loads, and tapered roller bearings between the spindle and the roller cutter, nearer the free end of the spindle than the cylindrical roller bearings and sustaining end thrust of the cutter outwardly from the vertical axis of the drill towards the spindle support, said spindle having an annular flange at its free end covering the full diameter of the end faces at the smaller ends of the tapered roller bearings, substantially as described.

4. In combination, a roller cutter having an annular flange extending inwardly of its bore at its base, a cylindrical raceway adjacent and in front of said flange, the bore of the cutter being tapered in front of said cylindrical raceway and extending uniformly all the way to the apex portion of said cutter, a spindle having a cylindrical raceway surface, roller bearings between the same and the cylindrical raceway of the cutter, said spindle having a tapered raceway and a terminal flange with a tapered end face complementary to and borne upon by a portion of the uniformly tapered wall of the cutter bore, and tapered rollers between the tapered raceway of the spindle and the wall of the tapered bore of the cutter, said terminal flange providing the inner wall of said tapered raceway.

CLARENCE E. REED.